United States Patent [19]

Humphrey

[11] 3,822,367

[45] July 2, 1974

[54] METHOD AND APPARATUS FOR REMOTE TESTING OF A TRANSMISSION LINE

[75] Inventor: Marion L. Humphrey, Bellwood, Ill.

[73] Assignee: Allstate Insurance Company, Northbrook, Ill.

[22] Filed: Aug. 29, 1972

[21] Appl. No.: 284,525

[52] U.S. Cl. .......... 179/175.3 R

[51] Int. Cl. .......... H04b 3/46

[58] Field of Search .......... 179/175.3, 175.1 R; 324/95, 77 B; 328/135, 162

[56] References Cited

UNITED STATES PATENTS

| | | | |
|---|---|---|---|
| 2,666,099 | 1/1954 | Bonner | 179/175.3 |
| 3,410,966 | 11/1968 | Davies | 179/175.2 R |
| 3,436,496 | 4/1969 | Ingle | 179/175.3 |
| 3,502,983 | 3/1970 | Ingle et al. | 328/162 |
| 3,674,947 | 7/1972 | Chulak | 179/175.2 R |
| 3,705,275 | 12/1972 | Leyburn et al. | 179/175.3 |

*Primary Examiner*—Kathleen H. Claffy
*Assistant Examiner*—Douglas W. Olms
*Attorney, Agent, or Firm*—Browne, Beveridge, DeGrandi & Kline

[57] ABSTRACT

A method and apparatus for testing a plurality of private information transmission lines which connect a plurality of regional offices with a plurality of local offices from a single location at a home office. A commercial telephone circuit link is established between the home office and the regional office associated with the transmission line to be tested by dialing the telephone number of the regional station at the home station on a commercial telephone handset. A selective coupling means is provided at each regional office for selectively coupling the information transmission lines at that office with the commercial telephone lines at the office and hence providing a complete testing loop from the home office to the transmission lines and back to the home office. The coupling means includes means for matching the impedance of the commercial telephone lines and the private transmission lines, means for adjusting the levels of the signals entering and exiting from the regional office and means for selectively connecting any of a plurality of transmission lines to the commercial telephone lines.

15 Claims, 2 Drawing Figures

METHOD AND APPARATUS FOR REMOTE TESTING OF A TRANSMISSION LINE

This invention relates to a method and apparatus for testing.

In the operation of modern business concerns, it is common for there to exist a main office located in one geographical area which is associated with a plurality of regional offices located in other geographical areas. Frequently, there are a plurality of local offices located within each regional area and associated with the regional office located within that area. It is frequently the case each of the local offices is connected to the regional office by private wires used for the transmission of data between the regional and local office and such wires are known as private lines. For instance, a digital computer may be located at the regional office which may have stored in it data which is pertinent to the operation of the business. Information is constantly being received at the local offices which should be either entered to or processed by the computer and this information is transmitted by the private lines to the computer while the processed information is then returned on the private lines from the computer to the local offices.

At each local office there is located equipment which is used for entering data to and receiving data from the private lines. For instance, it is common for there to be a receive/transmit D to A/A to D modem at the local offices which converts the digital information at the local office to analog information for transmission to the regional office and which then converts the analog information transmitted back on the private lines from the regional office to digital information for utilization at the local offices.

It is frequently desirable to test the private lines and the input/output equipment located at the local offices for signal degradation and equipment malfunctions. This is particularly true when a particular private line appears not to be operating properly, although it also may be desirable in certain situations to routinely test the private lines and equipment. As opposed to providing skilled personnel and test equipment at each of the regional offices to test the private lines and equipment associated with that regional office, it is desirable to be able to test any of the private lines and associated equipment from a single location.

The invention therefor provides a method and apparatus which permits any of the private lines and associated equipment to be tested from a single location at the main office. This is accomplished by establishing a commercial telephone circuit link from the main office to one of the regional offices by dialing the telephone number of the regional office at the main office with commercial telephone handset or handsets. In this way a communication link for testing is provided between the main office and regional offices by the commercial telephone lines. A selective coupling means is provided at each regional office which selectively couples the private lines associated with that regional office to the commercial telephone lines at the regional office, thus providing a testing link from the main office through to the private lines and back to the main office.

It is therefore an object of the invention to provide a method for testing a plurality of information transmission lines connecting a plurality of local offices with a plurality of regional offices from a single location at a main office by establishing a commercial telephone link between said main office and said regional office.

It is further an object of the invention to provide a method for testing equipment located at the local office.

It is still a further object of the invention to provide an apparatus for testing a plurality of transmission lines connecting a plurality of local offices with a plurality of regional offices from a single location at a main office.

The above objects are accomplished by establishing a commercial telephone circuit link between the home office and the regional office associated with the private transmission lines to be tested by dialing the telephone number of the regional office with a telephone handset at the main office. At each regional office there is located a selective coupler means which is operative to couple the commercial telephone lines at the regional office to a selected private line. The selective coupler is provided with means to match the impedance of the commercial lines and private lines, means to adjust the levels of signals going into the private lines and being reinserted to the commercial lines and means for establishing various switching conditions. The commercial singular link established is first tested for signal degradation by bridging two commercial circuits established at the regional office, sending a test signal around the link and measuring the degradation of the test signal with a peak to average ratio meter at the home station. The selective coupler means is then switched so that the test signal goes all the way through to the private lines and back to the home station, and the degradation of the private lines is determined by measuring the degradation of the complete loop and subtracting the value of degradation determined for the commercial circuits by themselves.

The invention will be better understood by referring to the description of a preferred embodiment below when taken in conjunction with the drawings in which.

Figure 1:
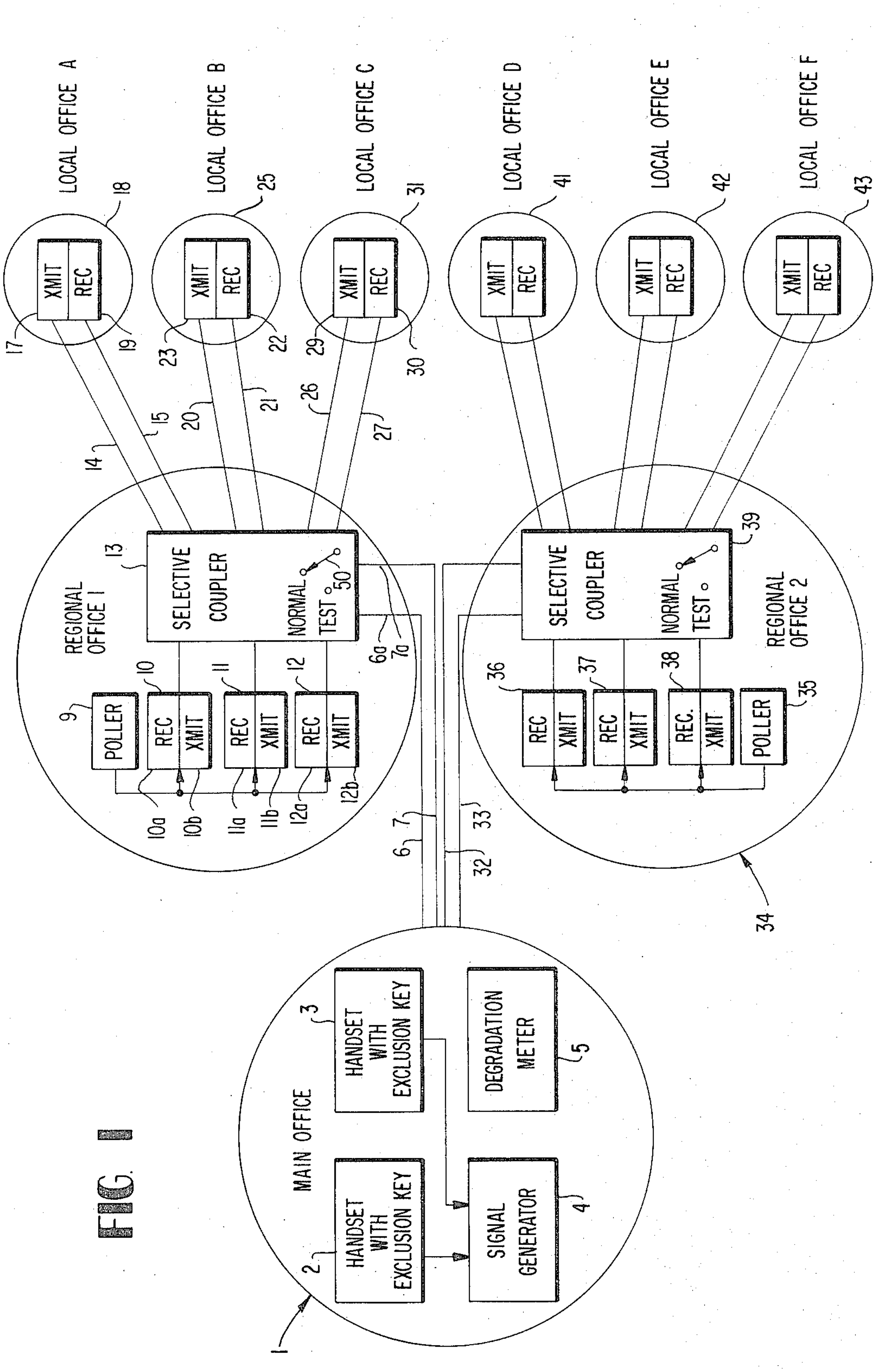
FIG. 1 is a diagrammatic illustration of the testing arrangement of the invention.

Referring to FIG. 1 a diagram of a typical geographical arrangement of a business concern is shown. The main office shown is where the company headquarters would normally be located, wherein the top officers of the company would ordinarily work and wherein company policy would normally be set. Associated with the main office are a plurality of regional offices shown as regional offices 1, 2 and 3, for servicing particular geographical areas. For instance, a nationwide business might have six regional offices for servicing the northeast, southeast, midwest, northwest and southwest of the country respectively, whereas a statewide business might have three or four regional offices for servicing different areas of the state. Associated with each regional office are a plurality of local offices shown as local offices A, B and C, for providing grass roots service to the local community.

Most modern businesses employ the services of an individual computer or computers to perform various functions relating to the operation of the business. Because of the relatively high cost of computer services, it is frequently uneconomical to locate a separate computer at each of the local offices of the business and a computer is therefore provided only at the regional offices with each regional office being tied to its local offices by information transmission lines or private lines for the transmission of data to and from the computer.

At each of the local offices is located an input/output device such as a receive/transmit A to D/D to A modem as is well known in the art. For instance, local offices A, B and C in FIG. 1 include modems 17, 23 and 29 respectively, comprised of transmit and receive portions 18/19, 24/22, and 28/30 respectively. Information is inputted to the transmit portion of the modem in digital form and is converted by the transmitted portion of the modem to analog form in which form it is transmitted over the transmission lines to the regional office. At the regional office there is a modem associated with each of the local offices which is identical to the modem at the local offices. Thus, at regional office 1 in FIG. 1 modems 10, 11 and 12 associated respectively with local offices A, B and C are illustrated.

In the normal operation of the system, selective coupler 13 shown at regional office 1 is in the normal position and allows the analog signals on the transmission lines to travel to and away from the modems at the regional office. Thus, a signal transmitted by transmit portion 18 of the modem 17 along line 14 would be received by the receive portion of modem 10 which converts the analog signal back into digital form for utilization at the regional office. To transmit information from the computer back to the local office, the digital information is converted to analog information by the transmit portion of modem 10 and is transmitted along line 15 to receive portion 19 of modem 17 at the local office which would convert the information back to digital form for utilization at the local office. The modems may further include amplifiers to amplify the signals before transmission, after reception or for turnaround transmission.

In FIG. 1 information coming in from the local offices may appear on any or all of the lines 14, 20, or 26 at any time. Since the computer can normally handle an input from only one of the lines at any given time, poller 9 is used to continuously scan the lines and to lock on to the particular line on which it first detects information to be present. If information first appears on one line and then on another, poller 9 is therefore effective to lock on to the line on which information first appeared and when transmission is finished on that line to then lock on to the other line on which information is present.

When selective coupler means 13 is switched from the normal position to the test position transmission lines 14, 15, 20, 21 and 26, 27 are disconnected from modems 10, 11 and 12 and are selectively connected to the commercial telephone lines at the regional office as will be described in greater detail below. When a telephone call or calls are then made at the main office to regional office 1, a telephone circuit link is established between the main office and the regional office and a test signal originated at the main office can travel all the way from the main office to the modem at the local offices and back to the main office which permits the information transmission lines and the modems at the local offices to be tested.

Figure 2:
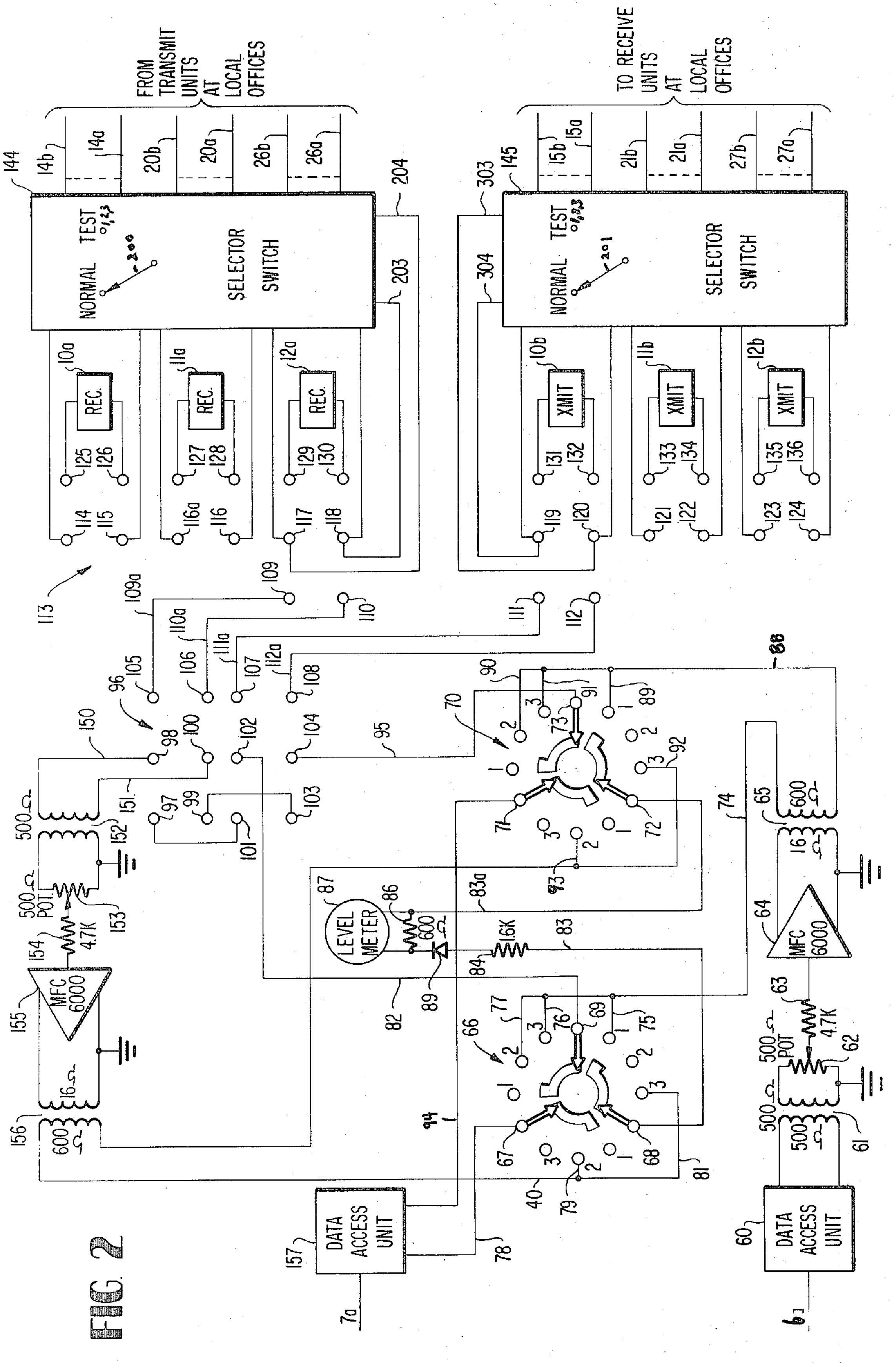
FIG. 2 is a schematic diagram of the selective coupling means of the invention which is located at each regional office of the diagram of FIG. 1.

Selective coupler means 13, one of which is located at each regional office, is shown in greater detail in the schematic of FIG. 2. The heart of the selective coupler means is three multi-position switches which control the destination of the test signal coming in over the commercial telephone lines. Switch sections 66 and 70 are two sections of a two-section, three-pole, three-position switch, with corresponding poles of the two sections being ganged together in an actual switch assembly. Thus, in FIG. 2, poles 67 and 71, 69 and 73, and 68 and 72, would be ganged together for simultaneous movement. Switch 96 is a four-pole, double-throw switch with an open center position and is connected at poles 102 and 104 through conductors 82 and 95 to poles 69 and 73 of switch sections 66 and 70, respectively. Switch 113 is a multi-pole double-throw switch with an open center position and is connected to four-pole double-throw switch 96 through wires 109a to 112a which connect terminals 109 to 112 of switch 113 with terminals 105 to 108 of switch 96. In order for a test signal coming in on the commercial telephone link to go all the way through to the information transmission lines switch sections 66 and 70 as well as switches 96 and 113 must be in the correct position, and this is a safety feature of the selective coupler means. Level meter 87 is a VU type meter which is connected through sections 66 and 70 to be either across the test signal coming in on the commercial telephone lines or across the signal being returned to the commercial telephone lines. Adjustable amplifier 64 is connected to amplify the signal coming in over the commercial telephone lines and adjustable amplifier 55 is connected to amplify the signal being returned to the commercial telephone lines. These amplfiers would be adjusted while level meter 87 is connected by switch section 66 to 70 to read the level of the appropriate signal.

Selector switches 144 and 145 which are actually one switch with one switch member 200, 201, but which have been illustrated as two switches for purposes of explanation as will be explained in detail below are provided to switch the private lines from the normal mode of operation which has been described in conjunction with FIG. 1 to a mode where the private lines and equipment at the local offices assoicated with the private lines could be tested. Switch members 200 and 201 on the selector switches 144 and 145, which are used for switching from the normal to the test mode, correspond to selector member 50 on the selective coupler means illustrated in FIG. 1. When switch members 200, 201 of selector switches 144 and 145 are in the normal position private lines 14 and 15 are connected through to the modem 10, private lines 20 and 21 are connected through to the modem 11, and so on, as explained above in conjunction with FIG. 1. Each private line, for instance private line 14 and private line 15 in FIG. 1 is actually a duplex private line and these duplex private lines are shown in FIG. 2 as lines 14*a*, 14*b*, 15*a*, 15*b* and so on. For ease of illustration in FIG. 2, modems 10, 11 and 12 of FIG. 1 have been broken up into receive modem portions 10*a*, 11*a*, and 12*a*, and transmit modem portions 10*b*, 11*b*, and 12*b*. It is to be understood, however, that while these modems are shown as being separate units in FIG. 2, they are in reality single units as shown in FIG. 1, and selector switches 144 and 145 which have been shown as separate switches to more clearly show the connections to the separate modem sections, are in reality a single switch.

When switch member 200, 201 is in the normal position, then duplex lines 14*a*, 14*b* and 15*a* and 15*b* are connected to poles 115, 114 and 120, 119 of multi-pole switch 113 through selector switch 114, 145. In a similar manner private lines 20*b*, 20*a*, 26*b*, 26*a*, 21*b*, 21*a*, 27*b*, and 27*a* are connected respectively to poles 116*a*, 116, 117, 118, 129, 122, 123 and 124. When double-throw multi-pole switch 113 is thus thrown to the right it is seen that each of the three duplex private lines shown is connected respectively to modems 10, 11, and 12 and normal operation of the private lines between the local office and the regional office may take place.

When it is desired to test one of the private lines or one of the modems at the end of the private lines, a telephone call is made from the main office with handset 2 shown in FIG. 1 to the regional office associated with the private line which it is desired to test and a commercial telephone circuit is thus established between the main office and the regional office. Before a test signal is sent down the telephone circuit, a conversation may take place between personnel at the main office and personnel at the regional office and problems encountered with private lines as well the sequence for testing the various private lines may be arranged between the personnel. If trouble is encountered in the telephone conversation between the main office and the regional office on the circuit established, then one handset at the main office would be hung up and the regional office would be redialed to obtain a better circuit. The circuit established by dialing with handset 2 is represented as circuit 6 in FIG. 1 and is connected to the commercial telephone line 6*a* at the regional station shown in FIGS. 1 and 2. It is this curcuit 6 which will carry the test signal from the main office to the regional office when a signal is generated by signal generator 4 located at the main office. Another commercial telephone circuit shown as circuit 7 in FIG. 1 is established to carry test signal returning from the regional office to the main office and this circuit is established by dialing with handset 3 shown in FIG. 1 and connects to commercial telephone line 7*a* at the regional office.

After the telephone conversation between the personnel at the main office and the personnel at the regional office, the exclusion key of handsets 2 and 3 is activated which cuts the handsets out of the circuits and connects signal generator 4 across circuit 6. The test signal may be an audio frequency signal of a single frequency.

According to a method of the invention, the private lines are tested for signal degradation by first testing the transmit and return commercial telephone circuits established for degradation by bridging the two circuits together at the regional office, sending a test signal through the loop, thus established, and measuring the degradation of the test signal. The selective coupling means is then activated at the regional office to couple the commercial telephone lines at the regional office to the private line to be tested and the test signal is sent all the way through the main office to the provate lines to the modem at the far end of the private lines and back through the regional office and through the receiving commercial telphone circuit to the main office. The degradation of the complete circuit is measured at the home office and the figure established for the degradtion of the commercial circuits by themselves is subtracted from the total degradation to provide a figure representative of the degradation of the private lines and/or equipment associated therewith.

The way in which the above method is carried out in conjunction with the selective coupling means shown in FIG. 2 will now be described in detail. The test signal enters the selective coupling means at data access unit 60 on commercial line 6. The data access unit 60 is a standard protective piece of equipment which is used wherever private apparatus is connected to the commercial telephone system and is a protective device known to those skilled in the art for protecting the telephone system against overloads. The output of data access unit 60 is connected to impedance matching transformer 61 which matches the impedance of the commercial telephone circuit to the input impedance of amplifier 64. The test signal is amplified in amplifier 64 by an amount dependent on the position of the slider of potentiometer 62. The output of amplfier 64 is connected to impedance matching transformer 65 which matches the output impedance of the amplifier to the impedance of the private lines.

In order to make the degradation measurement of the commercial circuit link switch 66, 70 is first turned to position 1 which effectively places the output of transformer 65 across level meter 87. This connection is made through conductor 74, terminal 1 of pole 68 of switch section 66, pole 68, conductor 83, resistor 84, diode 85, level meter 87, conductor 83*a*, pole 72 of switch section 70, terminal 1 of pole 72, and conductor 88. The test signal coming in on line 6 has been attenuated due to the distance which it has traveled along the commercial telephone circuit and must be raised in amplitude before it can be reinserted to commercial circuit 7. The level to which the signal should be raised for proper reinsertion may vary somewhat from regional station to regional station and is the level which taking into account the attenuation which the signal will encounter over the return commercial circuit will result in a signal of proper magnitude (audible if the circuits are used for voice communication) reaching the main station. The proper level for reinsertion at any given location may be obtained from the telephone company. The level of the signal at the output of transformer 65 is then raised by adjustment of the slider of potentiometer 62 until it reaches the proper reinsertion level.

After the signal is raised to the proper level switch 66, 70, is turned to position 2 which effectively brings the output of transformer 65 up to poles 102 and 104 of four-pole, two position switch 96. These connections are made through conductor 74, terminal 2 of pole 69 of switch section 66, pole 69, conductor 82, terminal 102, and conductor 88, terminal 2 of pole 73 of switch section 70, conductor 95 and pole 104.

In order to bridge the two commercial telephone circuits to make the initial degradation test with the switch 66, 70 in position 2, the four-pole double throw switch 96 is moved to the leftmost position so that poles 98, 100, 102, and 104 contact poles 97, 99, 101 and 103 respectively, thereby effectively connecting lines 74 and 88 to lines 151 and 150 respectively, while bridging the telephone circuits together.

The signal is coupled through transformer 152 through potentiometer 153 and input resistor 154 to amplifier 155. The potentiometer 153 is adjusted for zero gain for retransmission, the signal already having been set to the proper level by means of potentiometer 62 and amplifier 64. The output signal of amplifier 155 is coupled through transformer 156 which matches the output impedance of the amplifier with the input impedance of the commercial telephone lines to conductors 92 and 80 which because switch 66, 70 is in position 2 are connected through poles 71 and 67 to conductors 94 and 78 respectively which are connected to data access unit 157 which is similar to data access unit 70 already described. From data access 157 the test signal is returned to the main office by commercial circuit connected to line 7a. At the main office, the returned test signal is inputted to degradation meter 5 which also has the signal transmitted on circuit 6 as one of its inputs. The degradation meter 5 is a peak-to-average ratio meter which compares the peak-to-average ratios of the transmitted and received signals and from the respective ratios provides an indication of signal degradation. Some parameters of the signal which are reflected in the indication provided by the degradation meter are phase distortion, envelope delay distortion and noise. The degradation indication for the commercial circuits are recorded for use as a rerference point in the degradation measurement of the private lines. If the degradation recorded for the commercial link is believed to be abnormally high, then a re-dial or re-dials should be made to establish a commercial link having a satisfactory degradation value.

To measure the degradation of the private lines, the same telephone circuits as established for the measurement just described are retained, switch 66, 70 is again moved to position 1 which effectively places the output of transformer 65 across level meter 87 and the level of the signal is raised to be the correct level for transmission into the private lines. This correct level is determined for any data transmission system as being the level which after taking into account the attenuation of the private lines will result in a proper level being received at the local offices.

To transmit the signal through to the private lines, switch 66, 70 must be moved to position 2, which as described above, effectively brings the output of transformer 65 up to poles 104 and 102 of switch 96. Switch 96 is then moved to the right hand position so that poles 98, 100, 102 and 104 contact terminals 105, 106, 107 and 108, respectively, which terminals are connected by conductors 109a, 110a, 111a, and 112a to terminals 108, 110, and 111 and 112 of multi-pole switch 113. Switch member 200, 201 of switch 144, 195 is moved to one of the test positions which effectively brings the duplex private lines to poles 117, 118, 119 and 120 of switch 113. Thus, when member 200, 201 is moved to position 1, this effectively places lines 14b and 14a in contact with poles 117 and 118 through conductors 203 and 204 and places lines 15b and 15a in contact with poles 119 and 120 through conductors 303 and 304. Likewise, when switch member 200, 201 is switched to position 2, duplex private lines 20b, 20a, 21b, 21a are connected to poles 117, 118, 119 and 120, and so on for as many private lines as the system is designed to accommodate.

When multiposition switch 113 is moved to the left so that poles 117, 118, 119 and 120 contact terminals 109, 110, 111 and 112, then the output of the transformer 65 is effectively connected to the pair of transmit private lines brought to terminals 119 and 120 by selector switch 144, 145 and the input of transformer 152 is effectively connected to the output of the pair of transmit private lines brought to terminals 117 and 118 by selector switch 144, 145 and a circuit is completed from the main office through a regional office to a local office and back through the same regional office to the main office. The modems at the private lines have the capability of turning around a signal received at the receive portion and transmitting it at the transmit portion without the signal leaving the modem for utilization. Additionally, the modems include an amplifier for raising the received signal level before it is inserted at the transmit private line.

It is thus seen that in order for a signal to go all the way through to the private lines at least three switches must be in the proper position. This is a safty feature of the invention which prevents accidental coupling of the private lines to the commercial circuit.

The signal returning from the private line needs to be reamplified at the regional office to the proper level before it is inserted to the commercial telephone circuit. To effect this amplification switch 66, 70 is moved to position 3 which effectively places level meter 87 across the output of transformer 156 through conductor 80, terminal 3 of pole 68 of switch section 66, pole 68, conductor 83, level meter 87, conductor 83a, pole 72 of switch sections 70, terminal 3 of pole 72 and conductor 92. The level of the signal is then adjusted by potentiometer 153 which controls the gain of amplifier 155 to provide the proper level for retransmission into the commercial circuit. After adjustment, switch 66, 70 must be switched to position 2, for transmission and return of the test signal.

The degradation of the test signal is again measured with the peak-to-average ratio meter at the main office and a degradation figure for the complete loop from home office to local office and back to home office is thus established. The degradation figure previously established for the commercial telephone circuits by themselves is then subtracted from the degradation figure of the complete loop and the resulting figure represents the degradation of the private lines and equipment connected thereto.

While in the preferred embodiment of the invention, the private lines were described as being lines used for the transmission of data. It is to be understood that the scope of the invention extends to coupling a commercial telephone circuit link to private transmission lines which are used for any purpose, such as the transmission of voice signals, for instance, and the term information transmission lines as used in the claims of this invention should be interpreted as meaning lines for the transmission of any type of information.

While I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

I claim:

1. In a system comprising a main station, a plurality of first sub-stations and a plurality of second substations associated with each first sub-station and connected to said each first sub-station by receive and transmit information transmission lines, wherein each pair of receive and transmit lines connecting a second sub-station with a first sub-station comprises an information transmission link, a method of enabling a selected transmission link to be tested from said main station comprising the steps of:

establishing two separate commercial telephone circuits between said main station and the first sub-station which is connected to a transmission link to be tested by dialing the telephone number of said first sub-station at said main station on two separate telephone instruments, bridging said commercial telephone circuits together at said first sub-station, generating a reference test signal at said main station on one of said telephone circuits, measuring a first value of a pre-selected parameter of the returned test signal at said main station on the other of said telephone circuits, opening the bridge which connects said commercial telephone circuits together, manually coupling the receive line of said selected transmission link to one of said commercial telephone circuits and the transmit line to the other of said telephone circuits whereby a completed two-way connection is made between said main station and said selected transmission link, generating said reference test signal at said main station on said one of said telephone circuits which signal is transmitted to said transmission link and is returned from said transmission link by the other of said telephone circuits to said main station, measuring a second value of said pre-selected parameter of said returned signal at said main station, and subtracting said first value of said pre-selected parameter from said second value.

2. The method of claim 1 wherein said pre-selected parameter measured at said main station is signal degradation.

3. The method of claim 2 wherein information transmission and reception equipment is located at each of said second sub-stations and is connected to said information transmission lines at said second sub-stations and wherein said reference test signal is sent through said equipment to test said equipment as well as said transmission lines.

4. The method of claim 1 wherein the step of coupling comprises, matching the impedances of said commercial telephone circuit link and said information transmission lines, and at said first sub-station adjusting the level of said signal which enters said transmission lines and which is returned to said commercial telephone circuit.

5. The method of claim 3 wherein said information transmission lines are data transmission lines and wherein said information transmission and reception equipment comprises a receive/transmit modem.

6. The method of claim 4 wherein the level of said test signal at said first sub-station is further adjusted before said commercial telephone circuits are bridged together.

7. The method of claim 2 wherein said signal degradation is measured with a peak to average ratio meter at said main station.

8. In a system comprising a main station, a plurality of first sub-stations and a plurality of second sub-stations associated with each first sub-station and connected to said each first sub-station by receive and transmit information transmission lines, wherein each pair of receive and transmit lines connecting a second sub-station with a first sub-station comprises an information transmission link, apparatus for testing a selected transmission link from said main station comprising:

a unit at each of said first sub-stations including two inputs for commercial telephone lines first manual switch means at said first sub-stations for bridging said two inputs together whereby said commercial telephone lines are bridged together when connected to said inputs, second manual switch means at said first sub-stations for manually coupling the receive line of said selected transmission link to one of said inputs and the transmit line to the other of said inputs whereby when telephone circuits are dialed up on said commercial telephone lines a completed two-way testing path is made between said main station and said selected transmission link for testing said link.

9. The apparatus of claim 8 further comprising test signal generating means located at said main station for generating a test signal on said testing path and return signal measuring means located at said main station for measuring a selected parameter of the signal which is returned to said main station on said testing path.

10. The apparatus of claim 9 wherein said means for measuring a selected parameter is means for measuring signal degradation.

11. The apparatus of claim 9 wherein each of said coupling means includes means for matching the impedance of said commercial lines and said information transmission lines and means for adjusting the level of said signal for entrance to said transmission lines and for return to said commercial telephone lines.

12. The apparatus of claim 11 wherein each of said coupling means further includes selective switch means for determining which of said information transmission lines is coupled to said commercial telephone lines.

13. The apparatus of claim 12 wherein said means for adjusting the levels of said signal includes first and second adjustable amplifier means, and wherein said coupling means further includes multiposition switch means which includes means for connecting at least one of said inputs to said first adjustable amplifier means, means for connecting said inputs to said selective switch means for connection to said information transmission lines, and means for connecting at least one of said information transmission lines to said second adjustable amplifier means.

14. The apparatus of claim 13 wherein said multiposition switch means includes at least three mechanically independent switch means connected together and wherein each of said three switch means must be in a unique position to couple said signal from said inputs to said transmission lines.

15. The apparatus of claim 9 wherein said commercial lines are connected to transmitting and receiving equipment at said second sub-stations, said equipment thereby forming a part of said testing path.

* * * * *